United States Patent
Sakai et al.

(10) Patent No.: US 6,905,779 B2
(45) Date of Patent: Jun. 14, 2005

(54) SLIDING MATERIAL MADE OF COPPER ALLOY, METHOD OF PRODUCING SAME, SLIDING BEARING MATERIAL, AND METHOD OF PRODUCING SAME

(75) Inventors: Kenji Sakai, Nagoya (JP); Naohisa Kawakami, Nagoya (JP); Satoru Kurimoto, Nagoya (JP); Takashi Inaba, Nagoya (JP); Koichi Yamamoto, Nagoya (JP); Takayuki Shibayama, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 09/747,925

(22) Filed: Dec. 27, 2000

(65) Prior Publication Data

US 2004/0161625 A1 Aug. 19, 2004

(30) Foreign Application Priority Data

Feb. 29, 2000 (JP) ........................... 2000-053799

(51) Int. Cl.⁷ ............... F16C 33/06; B32B 15/20; B32B 15/18; B22F 3/00
(52) U.S. Cl. .................. 428/564; 428/570; 428/675; 428/677; 384/910; 384/912; 75/235; 75/240; 75/246; 419/9; 419/32
(58) Field of Search ................. 428/564, 570, 428/675, 677; 384/912, 910; 75/235, 240, 246; 419/9, 32

(56) References Cited

U.S. PATENT DOCUMENTS

| | | | |
|---|---|---|---|
| 4,623,590 A | * | 11/1986 | Hodes et al. ............. 428/408 |
| 4,941,919 A | | 7/1990 | Asada et al. |
| 4,959,274 A | * | 9/1990 | Mori et al. ............... 428/555 |
| 4,999,257 A | * | 3/1991 | Imai ........................ 428/555 |
| 5,328,772 A | * | 7/1994 | Tanaka et al. ........... 428/548 |
| 5,972,070 A | | 10/1999 | Kondoh et al. |
| 6,068,094 A | | 5/2000 | Takahashi et al. |
| 6,692,548 B2 | * | 2/2004 | Sakai et al. .............. 75/230 |

FOREIGN PATENT DOCUMENTS

| | | |
|---|---|---|
| GB | 596626 | 1/1948 |
| GB | 780791 | 8/1957 |
| JP | 040099836 | 7/1992 |
| JP | 080065806 | 7/1996 |
| JP | 090269026 A | 10/1997 |

* cited by examiner

Primary Examiner—Deborah Jones
Assistant Examiner—Jason L Savage
(74) Attorney, Agent, or Firm—Browdy and Neimark, P.L.L.C.

(57) ABSTRACT

A copper-based sliding material comprising sintered copper or sintered copper alloy, and 0.1 to 5 vol. % hard substance particles harder in hardness than said copper or copper alloy, said hard substance particles being substantially evenly dispersed so that, when at least one, randomly selected surface portion or sectional portion of said sintered copper or sintered copper alloy is partitioned into squares each having a side of 20 μm, at least one particle exists in each of squares not less than 80% of the whole squares. The copper-based sliding material has good anti-seizure property and superior resistance to fatigue without containing any lead.

6 Claims, 6 Drawing Sheets

X 500

X 500

SLIDING MATERIAL MADE OF COPPER ALLOY, METHOD OF PRODUCING SAME, SLIDING BEARING MATERIAL, AND METHOD OF PRODUCING SAME

BACKGROUND OF THE INVENTION

The invention relates to a copper-based sliding material in which the anti-seizure property and wear resistance thereof are enhanced by evenly dispersing hard substance particles, a method of producing the same, a sliding bearing and a method of producing the same.

As a copper-based sliding material, there is a bearing in which Kelmet is used. The Kelmet bearing is used as a sliding bearing for automobile engines etc. which sliding bearing is produced by the steps of providing copper-lead-based sintered alloy layer bonded to a back metal of steel, and providing an overlay layer bonded to the surface of the copper-lead-based sintered alloy layer. In the Kelmet bearing, even in a case where the overlay layer is worn away, lead contained in the copper-lead-based sintered alloy layer is fed to the sliding surface, so that good anti-seizure property is maintained.

Namely, in conventional copper-based sliding materials represented by the Kelmet bearing, the anti-seizure property is enhanced by adding lead (of about 20 mass %). However, since lead causes bad influence on the environment, it is preferred to reduce the content of lead as little as possible or not to use any lead. On the other hand, since lead brings about the function explained above, the low content of lead makes the anti-seizure property deteriorated.

SUMMARY OF THE INVENTION

Recently, it is tried to enhance the anti-seizure property and the wear resistance by making fine, hard substance particles dispersed in copper matrix. However, the inventors of the invention have found out that, in a case where copper alloy powder and fine, hard substance particles each having a size not more than 5 μm or not more than 10 μm are mixed in accordance with a powder-blending method to thereby provide a powder mixture and then the powder mixture is sintered, the hard substance particles 2 of much amount come to exist in copper matrix 1 along the boundaries 3 defined by adjacent copper alloy grains, as shown in FIG. 6. When the hard substance 2 has low wettability relative to copper, the inventors of the invention have also found out that the bonding of the copper alloy powder particles comes to be lowered, and that load applied from a counterpart shaft acts as shearing stress concentrated to the boundaries defined by the copper alloy grains adjacent to each other, so that there are such problems as premature breakage occurs and as fatigue resistance becomes inferior.

The invention is achieved in view of the above situation, and the object of the invention is to provide a copper-based sliding material having both of good anti-seizure property and superior resistance to fatigue without using any lead, a method of producing the same, a sliding bearing material, and a method of producing the same.

According to a first aspect of the invention, there is provided a copper-based sliding material made of a copper-based, sintered alloy comprising sintered copper or sintered copper alloy, and 0.1 to 5 vol. % hard substance particles harder in hardness than the copper or copper alloy, the hard substance particles being substantially evenly dispersed so that, when at least one, randomly selected surface portion or sectional portion of the sintered copper or sintered copper alloy is partitioned into squares each having a side of 20 μm, at least one of the particles exists in each of squares not less than 80% of the whole squares.

In the copper-based sliding material, since the fine, hard substance particles are evenly dispersed in the copper or copper alloy, the anti-seizure property and the resistance to fatigue are enhanced. Further, since the hard substance particles are evenly dispersed in the copper or copper alloy without gathering at the boundaries of the grains of the copper or copper alloy, load applied to the sliding material is dispersed with the result that the resistance to fatigue is enhanced. In a case where the amount of the hard substance particles is less than 0.1 vol. %, it becomes impossible to obtain the effect of enhancing both of the anti-seizure property and the resistance to fatigue, and in another case where the amount of the hard substance particles is more than 5 vol. %, the hard substance particles cause bad influence on the resistance to fatigue and enlarges the attacking on a counterpart member.

According to a second aspect of the invention, there is provided a method of producing the copper-based sliding material, in which method both of the copper powder or copper alloy powder and the powder of the hard substance harder in hardness than the copper or copper alloy are treated by use of a mechanical alloying method, so that it becomes possible to produce composite powder having such structure as the hard substance particles are dispersed evenly in each particle of the copper or copper alloy powder. By sintering this composite powder prepared through the mechanical alloying method to thereby produce the copper-based sliding material, it becomes possible to readily produce the copper-based sliding material in which the hard substance particles are evenly dispersed in the copper or copper alloy.

According to a third aspect of the invention, there is provided a sliding bearing material in which the copper-based sliding material according to the first aspect of the invention is bonded to a back metal, whereby it becomes possible for the sliding bearing material to have superior load-carrying capacity and superior resistance to fatigue.

According to a fourth aspect of the invention, there is provided a sliding bearing material having a three-layers structure, which sliding bearing material comprises a back metal, an intermediate layer made of copper or copper alloy which layer is bonded to the back metal, and a layer of the copper-based sliding material according to the first aspect of the invention bonded onto the intermediate layer, the copper-based sliding material layer which is an uppermost layer being provided with a thickness not less than 0.05 mm.

In this constitution, the bonding strength between the back metal and the copper-based sliding material layer can be enlarged by the intermediate layer interposed therebetween. Further, by thinning the thickness of the copper-based sliding material layer to thereby reduce the amount of the use thereof in view of the high production cost of the powder prepared by the mechanical alloying method, it becomes possible to reduce the production cost of the sliding bearing material. As regards the thickness of the copper-based sliding material layer, a thickness not less than 0.05 mm is required to maintain such effect as to enhance the anti-seizure property and the wear resistance.

According to a fifth aspect of the invention, there is provided a method for producing the sliding bearing material, in which method both of the copper or copper alloy powder and the hard substance powder harder in hardness than the copper or copper alloy are treated by the mechanical alloying process to thereby provide composite powder, by using which composite powder is formed the copper-based sliding material layer on the intermediate layer, so that it becomes possible to readily produce the sliding bearing material of three-layer structure at a low cost.

DESCRIPTION OF THE PREFFERED EMBODIMENTS OF THE INVENTION

One embodiment of the invention is described below while referring to FIGS. 1 to 5.

Figure 3:
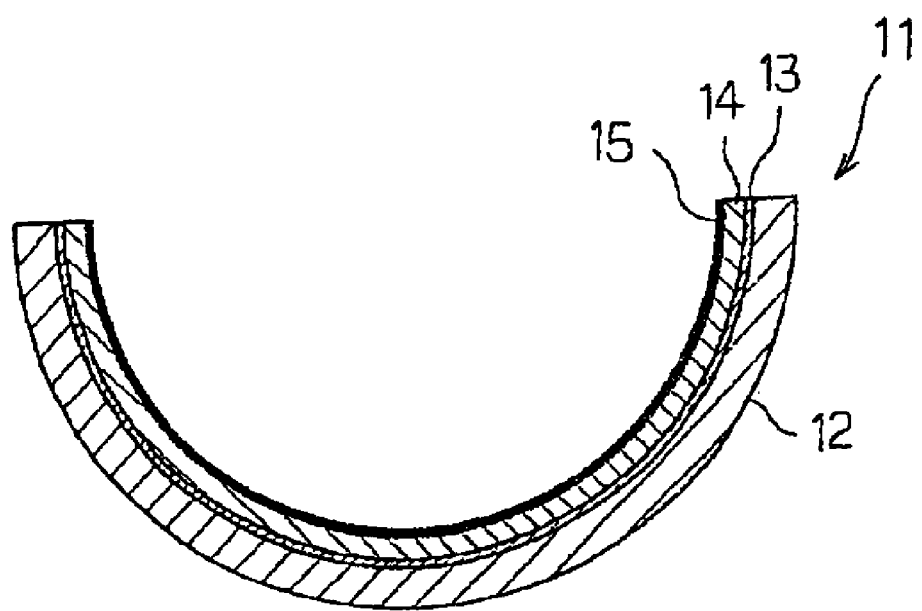
FIG. 3 is a sectional drawing of a half bearing.

A bearing 11 shown in FIG. 3 is called a half bearing, two pieces of which are paired to be used as a sliding bearing for automobile engines etc. This bearing 11 comprises a back metal 12 formed of, for example, a thin steel sheet, an intermediate layer 13 bonded to the back metal which intermediate layer is the plating layer or sintered layer of copper or copper alloy, the layer 14 of a copper-based sliding material related to the invention which layer is bonded to the intermediate layer, and an overlay layer 15 made of a soft metal or resin which overlay layer is bonded to the copper-based sliding material layer 14.

Figure 1:
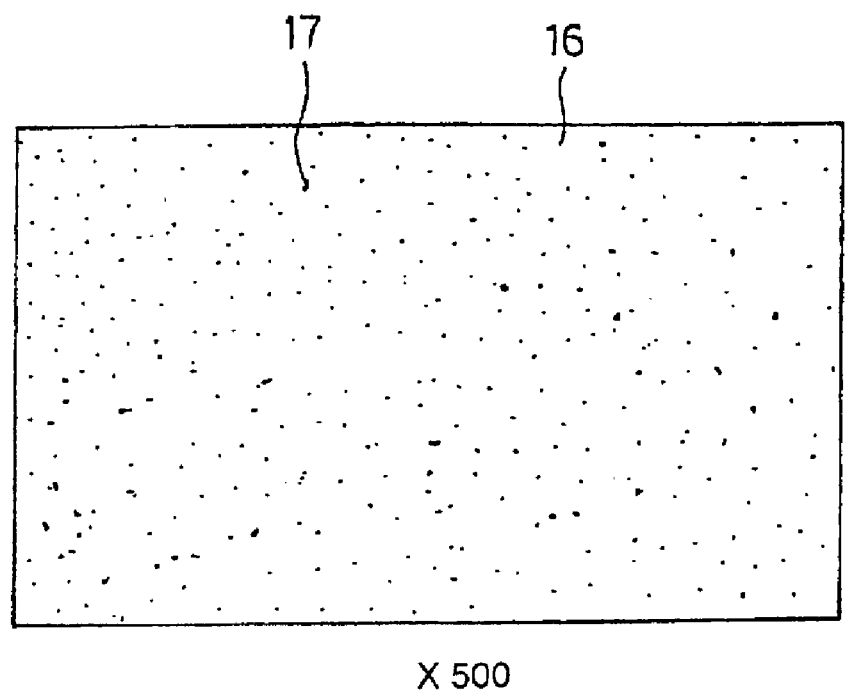
FIG. 1 is a schematic drawing depicted from the microstructure of the copper-based sliding material according to one embodiment of the invention.

The copper-based sliding material layer 14 is made of a copper-based sintered alloy, which contains 0.1 to 5 vol. % hard substance particles of carbide such as, for example, WC or $Al_2O_3$ in copper or copper alloy matrix which hard substance particles are harder in hardness than the copper or copper alloy matrix. In addition, in the copper-based sliding material layer (copper-based sintered alloy) 14, the hard substance particles 17 are evenly dispersed in the copper or copper alloy matrix 16, as shown in FIG. 1. In FIG. 1, the matrix 16 is shown as a white color portion, and the hard substance particles 17 are shown as black color dots or points.

In this case, the degree of the even dispersion of the hard substance particles 17 is such that, when at least one, randomly selected surface portion or sectional portion of the sintered copper-based sliding material layer 14 is partitioned into squares each having a side of 20 μm, at least one of the particles 17 exists in each of squares not less than 80% of the whole squares.

In this embodiment, a rectangular or square area not less than 0.01 mm² was selected regarding one randomly selected portion of the sintered copper-based sliding material layer 14, and this area was partitioned into a plurality of squares (, that is, not less than 25 pieces of squares) each having a side of 20 μm in order to estimate the degree of the even dispersion of the hard substance particles 17. As the result thereof, at least one of the hard substance particles 17 existed in each of squares not less than 80% of the whole squares. When providing the square partitions each having a side of 20 μm, a plurality of portions spaced apart from each other may be randomly selected, in each of which portions one partition may be provided or in each of which portions a plurality of partitions may be provided. In other words, the degree of the even dispersion of the hard substance particles was such that at least one of the hard substance particles existed in each of not less than 80% pieces of the total partitions selected randomly in the above-explained manner.

In addition to WC and $Al_2O_3$, the hard substance may be at least one selected from the following substances:

borides—NiB, $Ni_3B$, $CrB_2$, CrB, $ZrB_2$, CoB, $TiB_2$, $VB_2$, $TaB_2$, WB, MoB, Fe-Bb based substances and etc.;

silicides—$TiSi_2$, $WSi_2$, $MoSi_2$, $TaSi_2$, $CrSi_2$, Fe—Si based substances, Mn—Si based substances, and etc.;

oxides—$SiO_2$, $TiO_2$, $ZrO_2$, $WO_3$, $MoO_3$, Mn—O based substances, Fe—O based substances, V—O based substances and etc.;

nitrides—$Si_3N_4$, TiN, ZrN, TaN, VN, AlN, c-BN, $Cr_2N$ and etc.;

carbides—$Mo_2C$, $W_2C$, SiC, $B_4C$, TiC, TaC, VC, ZrC and etc.;

intermetallic compounds—Ni—Sn based substances, Fe—W based substances, Fe—Mo based substances, Fe—Mn based substances, Fe—Cr based substances, Fe—Al based substances, Cr—Al based substances, V—Al based substances, Ti—Al based substances, W—Al based substances and etc.;

metals—W, Mo and etc.; and other hard substances—Ni-based, self-fluxing alloys (such as Ni—B—Si based alloys), Co-based, self-fluxing alloys (such as Co—Mo—Cr—Si—B based alloys) and etc.

Then, a method of producing the half bearing 11 is described below.

Figure 2:
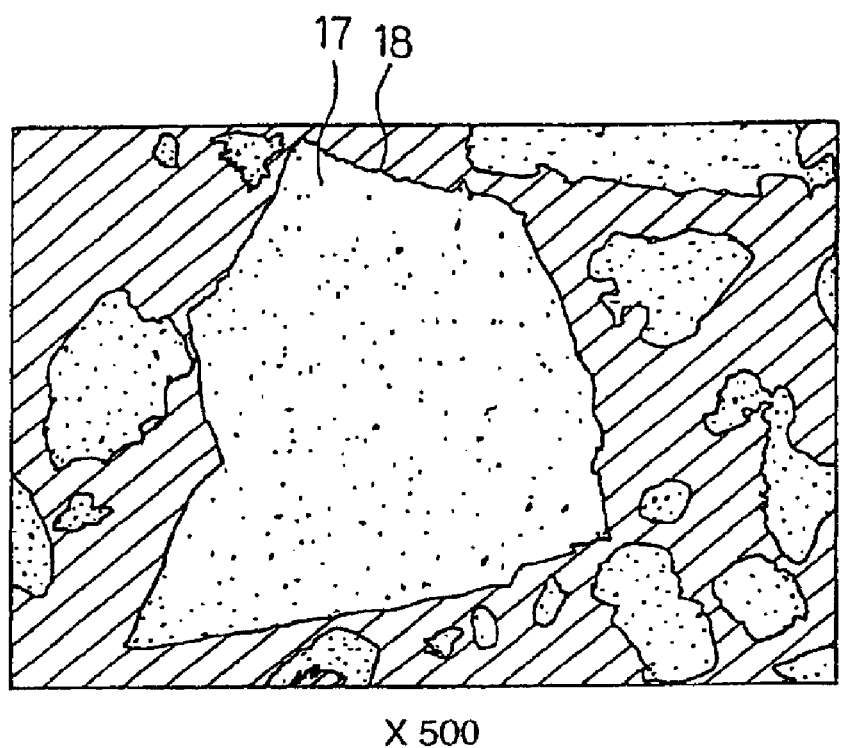
FIG. 2 is a schematic drawing depicted from the microstructure of the composite powder for sintering which is produced by the mechanical alloying method.

First, both of copper or copper alloy powder and the powder of the hard substance were treated by the mechanical alloying method to thereby obtain composite powder in which hard substance particles were evenly dispersed in each particle of the copper or copper alloy powder. By performing the treatment through the mechanical alloying method, the copper or copper alloy powder were subjected to the repetition of pressure bonding and pulverizing, so that each of the hard substance particles was contained in the interior of each of the powder particles of the copper or copper alloy. As the result thereof, the treated powder of the copper or copper alloy became composite powder particles 18 each having the hard substance particles 17 evenly dispersed in the interior thereof, as shown in FIG. 2. In FIG. 2, portions depicted by oblique lines indicate resin used for fixing the powder particles 18.

On the other hand, to provide the intermediate layer 13, copper or copper alloy plating was provided on the steel sheet used for the back metal 12, or copper or copper alloy powder was spread onto the steel sheet. Then, the powder 18 obtained above was spread onto the copper or copper alloy plating or the powder layer provided on the steel sheet, and they were sintered at a temperature of 800 to 920° C. for about 15 minutes and then were rolled. Further, in order to enhance the density thereof, the sintering and the rolling thereof were repeated, whereby a bimetal was produced in which a copper-based sliding material layer 14 is bonded to the steel sheet through the intermediate layer 13. Alternatively, the powder 18 may be spread directly on the steel sheet to thereby provide the copper-based sliding material layer 14 without interposing the intermediate layer 13 between them. After thus producing the bimetal, the bimetal was cut into a predetermined width and a predetermined length, and the cut bimetal was bent to have a semi-cylindrical shape with the surface of the sliding material layer 14 being finished by machining. After that, the overlay layer 15 was bonded onto the sliding material layer 14.

Thus, the half sliding bearing 3 shown in FIG. 3 was formed. Two pieces of the half bearing 11 are butted to form a sliding bearing having a cylindrical shape, which sliding bearing can be used as a main bearing supporting a crank shaft for automobile engines or as a connecting-rod bearing.

Regarding the products embodying the invention and comparative products each of which was made of the powder having the compositions "A" and "B" shown in the copper-based sliding material (or the intermediate layer 13), in which bonding test a tensile force was applied in a direction along the bonding interface defined between the back metal 12 and the copper-based sliding material 14, and a tensile stress at the time when the layer of the copper-based sliding material was peeled off from the back metal was deemed to be the bonding strength.

TABLE 1

| | | copper-based sliding material layer | | | | | | | intermediate layer | | bonding |
| | | composition | | | | | | | | | |
| | | composition "A" (mass %) | | | | | "B" (vol %) | | thickness | composition | thickness | strength |
| | No. | Cu | Sn | Ni | Pb | Bi | WC | Al₂O₃ | (mm) | "C" (mass %) | (mm) | N/mm² |
| Embodiment Products | 1 | the balance | 6 | 1.5 | — | — | 1.5 | — | 0.4 | — | — | 280 |
| | 2 | the balance | 6 | 1.5 | — | — | 1.5 | — | 0.2 | Cu—6Sn—1.5Ni | 0.2 | 300 |
| | 3 | the balance | — | — | — | — | — | 3 | 0.4 | — | — | 190 |
| | 4 | the balance | — | — | — | — | — | 3 | 0.2 | Cu—10Sn | 0.2 | 260 |
| | 5 | the balance | — | 2 | — | — | — | 1 | 0.4 | — | — | 230 |
| | 6 | the balance | — | 2 | — | — | — | 1 | 0.2 | Cu—10Sn | 0.2 | 260 |
| | 7 | the balance | 3 | 1.5 | — | — | 2 | — | 0.4 | — | — | 240 |
| | 8 | the balance | 10 | — | — | 5 | 1.5 | — | 0.4 | — | — | 220 |
| Comparative Products | 1 | the balance | — | — | — | — | — | — | 0.4 | — | — | 200 |
| | 2 | the balance | 6 | 1.5 | — | — | — | — | 0.4 | — | — | 300 |
| | 3 | the balance | 6 | 1.5 | — | — | 1.5 | — | 0.4 | — | — | 210 |
| | 4 | the balance | — | — | — | — | — | 6 | 0.4 | — | — | 150 |
| | 5 | the balance | 3.5 | — | 23 | — | — | — | 0.4 | — | — | 140 |

Figure 4:
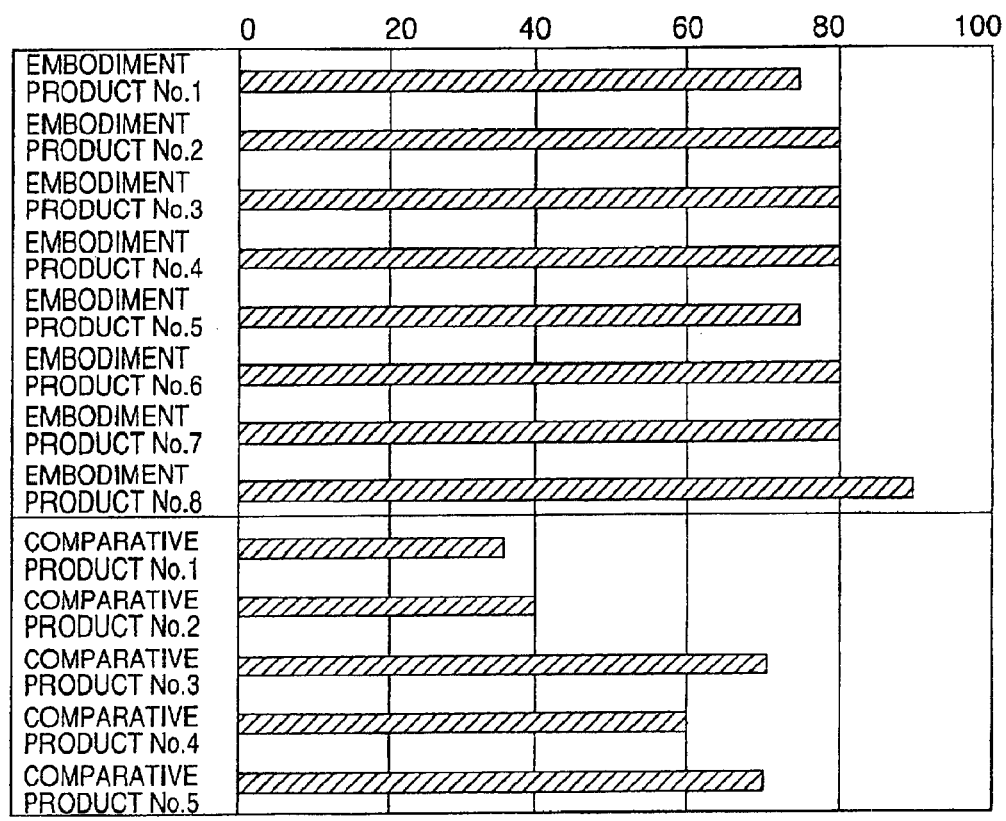
FIG. 4 is a graph showing the results of the seizure test.
Figure 5:
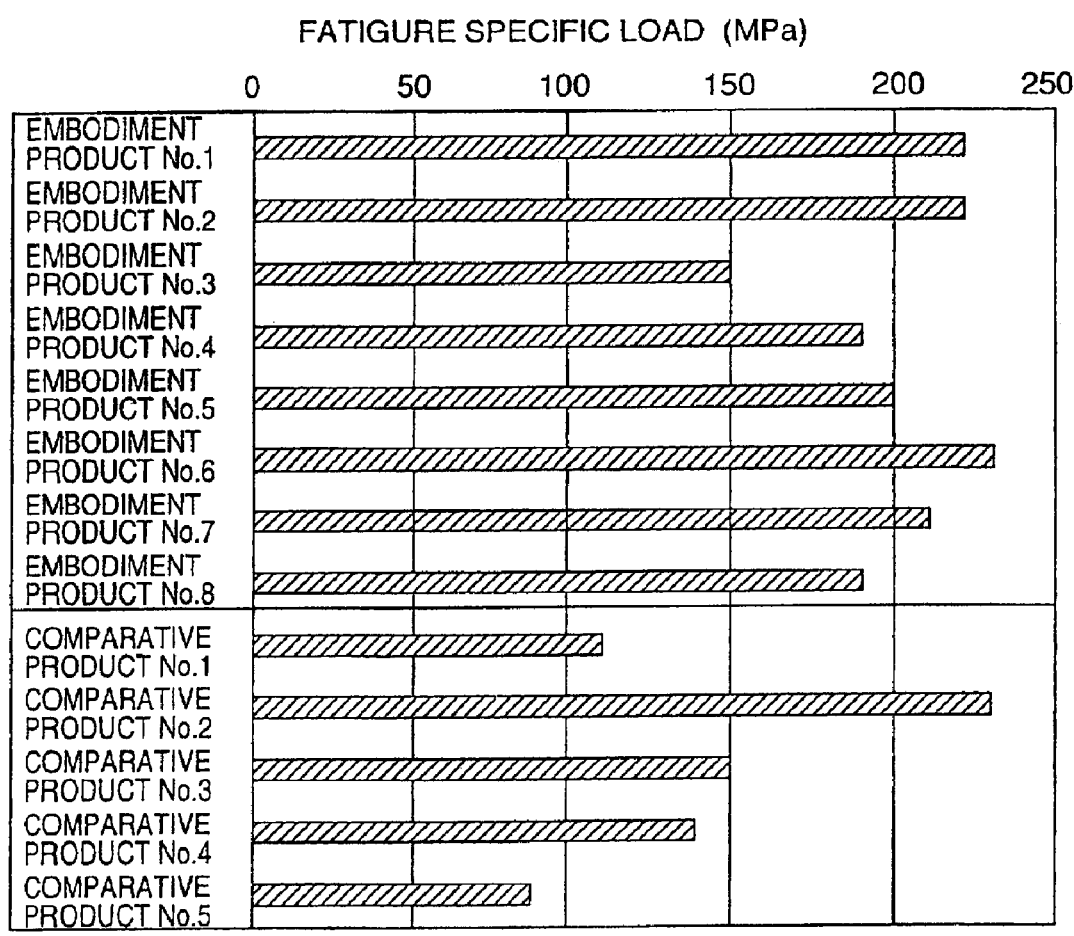
FIG. 5 is a graph showing the results of the fatigue test.
Figure 6:
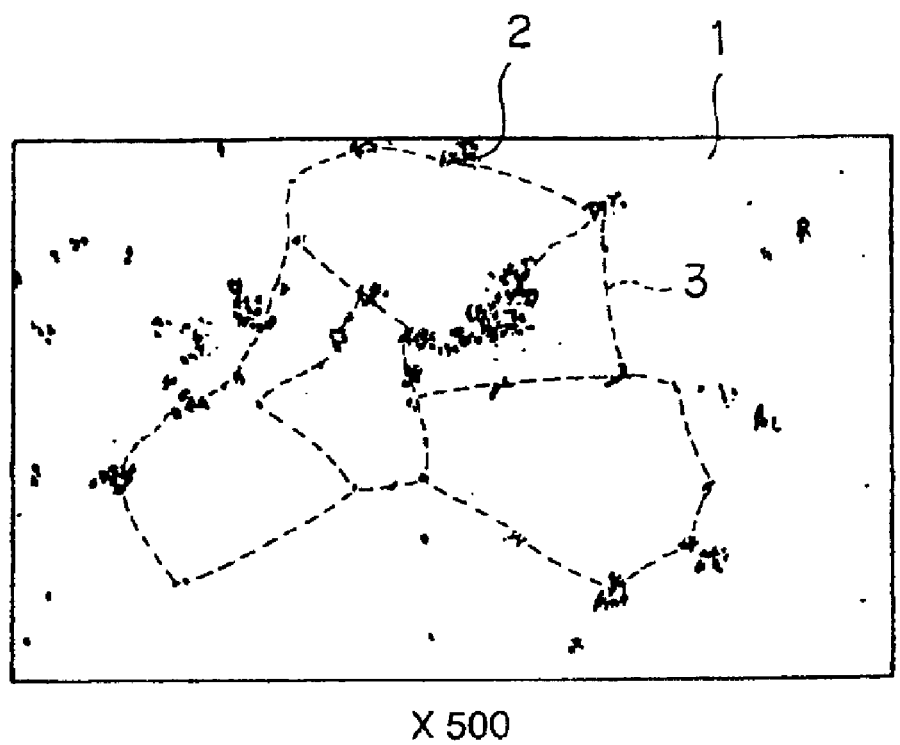
FIG. 6 is a drawing corresponding to FIG. 1 regarding the copper-based sliding material powder produced by the powder-blending method.

Table 1 in compliance with the manner described above, the inventors of the invention performed seizure test, fatigue test, and bonding test, the results of each of the tests being shown in Table 1, and in FIGS. 4 and 5. In Table 1, the composition "A" is the composition of the copper or copper alloy, the composition "B" being that of the hard substance particles, the composition "C" being that of the intermediate layer 13.

In the seizure test, a rotating shaft driven by a motor was supported by a bearing similar to that of FIG. 3 (, which bearing is, however, provided with no overlay layer 15 in order to more clearly observe the characteristics of the copper-based sliding material 14), and the running-in was performed in the initial period of 60 minutes. Thereafter, the feed rate of the lubricant was reduced to stepwise raise 5 MPa by 5 MPa the specific load of the bearing, the driving being performed for 10 minutes per each of the specific loads of the bearing. In this test, a specific load lower by one step than the specific load of the bearing measured at the time when the temperature of the back face of the bearing exceeded 220° C. or when the driving current of the motor driven to rotate the rotating shaft came to have an abnormal value was deemed to be the maximum specific load with no seizure. Other test conditions are shown in Table 2.

In the fatigue test, only a small piece of the copper-based sliding material 14 was used, and a test load was applied onto the small piece. The test load was raised stepwise 10 MPa by 10 MPa from the initial test load of 50 MPa, the test load being applied 50,000 times per each test load in a sine-wave manner, and the test load at the time when a crack occurred in the small piece was deemed to be the fatigue breakage load.

The bonding test was performed to examine the bonding strength obtained between the back metal and the layer 14 of

TABLE 2

| Item | Condition |
| --- | --- |
| diameter of shaft | 53 mm |
| width of bearing | 13 mm |
| peripheral speed | 10 m/sec. |
| lubricant | SAE #20 |
| feed rate of lubricant | 12.5 ml/minute |
| material of shaft | JIS-S55C as quenched product |
| shaft roughness | not more than R max 1.0 μm |

Specific method for producing the embodiment bimetal products Nos. 1 to 8 and the comparative bimetal products Nos. 1 to 5 are described below.

"Products Nos. 1 to 8 Embodying the Invention"

Both of the atomized powder of the composition "A" having a particle size not more than 250 μm (, however, in each of the products Nos. 3 and 4 electrolytic powder was used) and the particles of the composition "B" having the average particle size of 1 μm were treated for 50 hours by the mechanical alloying method disclosed in JP-A-4-28802, so that a composite powder was produced in which the particles (each having a size of about 1 to about 6 μm) of the composition "B" are substantially evenly dispersed in each particle (having a size not more than 300 μm) of the powder of the composition "A". This composite powder was spread directly on the steel sheet in the case of the embodiment products Nos. 1, 3, 5, 7, and 8 (, that is, the steel sheet was provided with no intermediate layer 13). In the case of the embodiment products Nos. 2, 4, and 6, the powder of the composition "C" and the mixture powder were spread in this order on the steel sheet (, that is, an intermediate layer 13 was provided). After that, both of the sintering and the rolling thereof were repeated two times, whereby the bimetal products were produced.

"Comparative Products Nos. 1, 2 and 5"

Each of comparative bimetal products Nos. 1, 2 and 5 were produced by the steps of spreading on the steel sheet the atomized powder of the composition "A" having the particle size not more than 250 μm (, however, in comparative product No. 1 electrolytic powder was used), and repeating two times both of the sintering and rolling thereof.

"Comparative Product No. 3"

Comparative bimetal product No. 3 was produced by the steps of mixing for one hour both of the atomized powder of the composition "A" having a particle size not more than 250 μm and the particles of the composition "B" having an average particle size of about 1 μm by use of a conventional powder-blending method to thereby produce a mixture powder, spreading this mixture powder on the steel sheet, and repeating two times both of the sintering and rolling thereof.

"Comparative Product No. 4"

Comparative bimetal product No. 4 was produced by the steps of treating by use of the mechanical alloying method for 50 hours both of the electrolytic powder of the composition "A" having a particle size not more than 250 μm and the particles of the composition "B" having an average particle size of about 1 μm to thereby produce a composite powder in which the particles of the composition "B" were evenly dispersed in each of the powder particles of the composition "A", spreading this mixture powder on the steel sheet, and repeating two times both of the sintering and rolling thereof.

The analysis of the test results regarding the above bimetal products is described below.

First, on the surface of each of the embodiment products Nos. 1 to 8 and the comparative product No. 3, partitions each having a square shape having an area of 0.01 m² were formed at a randomly selected surface portion so that each of the partitions had one side of 20 μm and so that 25 pieces of the partition were provided, and regarding these partitions the dispersion of the hard substance particles each having a size of about 1 to about 6 μm was examined. As the result thereof, in each of the embodiment product Nos. 1 to 8, at least one of the hard substance particles existed in each of the partitions of 92 to 100% of the whole partitions. On the other hand, in the comparative product No. 3, at least one of the hard substance particles existed in each of the partitions of 60% of the whole partitions. FIG. 1 shows the dispersion of the hard substance particles 17 regarding the embodiment product No. 1.

The comparative product No. 5 contains much amount of lead of about 23 mass %, which product corresponds to the conventional Kelmet bearing. In comparing the embodiment products Nos. 1 to 8 with the comparative product No. 5, although the anti-seizure property of each of the embodiment products Nos. 1 to 8 is equivalent to or more than that of the comparative product No. 5, the resistance to fatigue of each of the embodiment products Nos. 1 to 8 is remarkably enhanced in comparison with that of the comparative product No. 5 because each of the products Nos. 1 to 8 contains no Pb which is a soft metal.

The reason why the superior anti-seizure property is brought about in spite of no lead in each of the products Nos. 1 to 8 is that the hard substance particles 17 harder in hardness than the matrix 16 are evenly dispersed and that the hard substance particles become convex in shape relative to the matrix 16 to thereby come to be in lapping contact with a counterpart shaft.

The load of the counterpart shaft is carried by the hard substance particles directly contacting with the shaft. The load applied to the hard substance particles 17 functions as shearing stress exerted to the boundary defined between the hard substance particles 17 and the matrix 16 surrounding the hard substance particles. However, since the hard substance particles 17 are fine in size and are dispersed in such an even, high density state as at least one of the hard substance particles 17 exists in a square partition having one side of about 20 μm at a probability of 80% or more, a load portion which is applied to one of the hard substance particles 17 becomes small, so that there occurs no fear that any crack is caused at the boundary, whereby the resistance to fatigue of each of the products Nos. 1 to 8 is enhanced.

The embodiment product No. 1 differs from the comparative product No. 3 in the respect of whether or not the compositions "A" and "B" are treated by the mechanical alloying method, that is, whether or not the hard substance particles 17 are evenly dispersed. In comparing the embodiment product No. 1 with the comparative product No. 3, the anti-seizure property of the embodiment product No. 1 is slightly higher than that of the comparative product No. 3, however, the resistance to fatigue of the embodiment product No. 1 is remarkably superior to the comparative product No. 3. Thus, it is appreciated that the even dispersing of the hard substance particles 17 is effective to enhance the anti-seizure property and in particular the resistance to fatigue.

In a case where the content of the hard substance particles 17 exceeds 5 vol. %, they cause bad influence particularly on the anti-seizure property. For example, the embodiment product No. 3 differs from the comparative product No. 4 in that the former contains the hard substance particles 17 of 3 vol. % while the latter contains that of 6 vol. %. The comparative product No. 4 containing the much amount of the hard substance particles 17 has the resistance to fatigue substantially equivalent to that of the embodiment product No. 3, however, the anti-seizure property of the comparative product No. 4 is very inferior to that of the embodiment product No. 3.

In each pair of the embodiment products Nos. 1 and 2, the embodiment products Nos. 3 and 4, and the embodiment products Nos. 5 and 6, the former differs from the latter in that the former has no intermediate layer 13 with the copper-based sliding material layer 14 being made to have such a large thickness as to be about 0.4 mm while the latter has an intermediate layer 13 and the copper-based sliding material layer 14 made to have such a thin layer as to be about 0.2 mm in thickness. Regarding each of the anti-seizure property and the resistance to fatigue, the former embodiment products Nos. 1, 3 and 5 are equivalent to the latter embodiment products Nos. 2, 4 and 6, respectively. However, the latter embodiment products Nos. 2, 4 and 6 each provided with the intermediate layer 13 have the enhanced bonding strengths in comparison with that of the former embodiment products Nos. 1, 3 and 5, respectively.

Thus, even in a case where the intermediate layer 13 is provided while the thickness of the copper-based sliding material layer 14 is reduced by the value corresponding to the thickness of the intermediate layer 13, it becomes possible to obtain the products superior regarding each of the bonding strength, anti-seizure property and the resistance to fatigue. Therefore, it becomes possible to reduce the amount of the expensive powder treated by the mechanical alloying method, so that the sliding bearing can be produced with a relatively low cost.

The invention is not limited to the products of the embodiments and/or the drawings but can be extended to or can be changed to the case described below.

In a case of a hard substance having good wettability relative to the copper or copper alloy, the powder of this hard substance and the powder of the copper or copper alloy may be mixed with each other by use of a usual powder-blending method without using any mechanical alloying method. Further, the intermediate layer 13 may be provided with a multi-layer structure in which copper or copper alloy is coated on a copper-plated steel sheet. The copper-based sliding material can be used not only for bearings but also for other sliding materials.

What is claimed is:

1. A copper-based sliding material consisting of sintered copper or lead-free sintered copper alloy, and 0.1 to 5 vol. % hard substance particles harder in hardness than said copper of copper alloy, said hard substance particles being substantially evenly dispersed in said copper or copper alloy so that, when at least one, randomly selected surface portion or sectional portion of said sintered copper or sintered copper alloy is partitioned into squares each having a side of 20 $\mu$m, at least one of the particles exists in each of squares not less than 80% of the whole squares.

2. A method of producing a copper-based sliding material according to claim 1, comprising the steps of treating copper or lead-free copper alloy powder and hard substance powder harder in hardness than said copper or copper alloy through mechanical alloying process so that composite powder is prepared in which hard substance particles of said hard substance powder is substantially evenly dispersed in each particle of said copper or copper alloy powder, and sintering said powder mixture.

3. A sliding bearing material comprising a back metal, and a layer of a copper-based sliding material according to claim 1 which is bonded onto said back metal.

4. A sliding bearing material having a three-layers structure, said sliding bearing material comprising a back metal, an intermediate layer made of copper or copper alloy which layer is bonded to the back metal, and a layer of a copper-based sliding material according to claim 1 which is bonded onto said intermediate layer, said copper-based sliding material layer which is an uppermost layer being provided with a thickness not less than 0.05 mm.

5. A method of producing a sliding bearing material according to claim 4, comprising the steps of treating both of copper or copper alloy powder and hard substance powder harder in hardness than said copper or said copper alloy through mechanical alloying process so that composite powder is prepared in which hard substance particles of said hard substance powder is substantially evenly dispersed in each particle of said copper or copper alloy powder, providing said intermediate layer on said back metal by plating of said copper or copper alloy and/or by spreading powder of copper or copper alloy powder onto said back metal, and spreading and sintering said composite powder on said intermediate layer.

6. A copper-based sliding material consisting essentially of sintered copper or sintered copper alloy, and 0.1 to 5 vol. % hard substance particles harder in hardness than said copper of copper alloy, said copper-based sliding material being substantially free of any other material in a functional amount, said hard substance particles being substantially evenly dispersed in said copper or copper alloy so that, when at least one, randomly selected surface portion or sectional portion of said sintered copper or sintered copper alloy is partitioned into squares each having a side of 20 $\mu$m, at least one of the particles exists in each of squares not less than 80% of the whole squares.

* * * * *

UNITED STATES PATENT AND TRADEMARK OFFICE
CERTIFICATE OF CORRECTION

| | | |
|---|---|---|
| PATENT NO. | : 6,905,779 B2 | Page 1 of 1 |
| APPLICATION NO. | : 09/747925 | |
| DATED | : June 14, 2005 | |
| INVENTOR(S) | : Sakai et al. | |

It is certified that error appears in the above-identified patent and that said Letters Patent is hereby corrected as shown below:

1) In Column 9, line 18, the text "copper of copper alloy" should read --copper or copper alloy--.

Signed and Sealed this

Twenty-third Day of January, 2007

JON W. DUDAS
*Director of the United States Patent and Trademark Office*